US012465298B2

(12) United States Patent
Wang et al.

(10) Patent No.: US 12,465,298 B2
(45) Date of Patent: Nov. 11, 2025

(54) ROBOTIC ARM-BASED CLINICAL MICRO-CT SYSTEM AND METHOD

(71) Applicant: Rensselaer Polytechnic Institute, Troy, NY (US)

(72) Inventors: Ge Wang, Loudonville, NY (US); Mengzhou Li, Troy, NY (US); Zheng Fang, Troy, NY (US); Wenxiang Cong, Albany, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 344 days.

(21) Appl. No.: 17/980,948

(22) Filed: Nov. 4, 2022

(65) Prior Publication Data

US 2023/0133386 A1 May 4, 2023

Related U.S. Application Data

(60) Provisional application No. 63/399,346, filed on Aug. 19, 2022, provisional application No. 63/323,751, (Continued)

(51) Int. Cl.
*A61B 6/03* (2006.01)
*A61B 6/00* (2024.01)
(Continued)

(52) U.S. Cl.
CPC .............. *A61B 6/032* (2013.01); *A61B 6/035* (2013.01); *A61B 6/4241* (2013.01);
(Continued)

(58) Field of Classification Search
CPC ....... A61B 6/032; A61B 6/035; A61B 6/4417; A61B 6/5205; A61B 6/5258; A61B 6/4241; A61B 6/4458; A61B 6/5235; A61B 6/5264; A61B 6/4452; A61B 6/482; A61B 6/4078; A61B 6/5282; A61B 6/542; A61B 6/50; A61B 6/06; A61B 6/405; A61B 6/545; A61B 6/488; A61B 6/027;
(Continued)

(56) References Cited

U.S. PATENT DOCUMENTS 6,869,217 B2   3/2005  Rasche et al.
7,840,249 B2  11/2010  Wang et al.
(Continued)

FOREIGN PATENT DOCUMENTS

WO   2017172641 A1  10/2017
WO   2020033355 A1   2/2020

*Primary Examiner* — Irakli Kiknadze
(74) *Attorney, Agent, or Firm* — Barclay Damon LLP; Anthony P. Gangemi (57) ABSTRACT

In one embodiment, there is provided a micro-CT (computed tomography) apparatus. The micro-CT apparatus includes an x-ray source coupled to a source robotic arm, an x-ray detector coupled to a detector robotic arm, and a computing device. The computing device includes a data acquisition module and a reconstruction module. The data acquisition module is configured to acquire local scan data of a volume of interest (VOI) contained in an imaging object. The reconstruction module is configured to reconstruct an image of the VOI based, at least in part, on the local scan data, and based, at least in part, on background compensation data.

20 Claims, 3 Drawing Sheets

Related U.S. Application Data filed on Mar. 25, 2022, provisional application No. 63/275,616, filed on Nov. 4, 2021.

(51) Int. Cl.
  *A61B 6/42* (2024.01)
  *G06T 11/00* (2006.01)

(52) U.S. Cl.
  CPC .......... *A61B 6/4417* (2013.01); *A61B 6/4458* (2013.01); *A61B 6/5205* (2013.01); *A61B 6/5235* (2013.01); *A61B 6/5258* (2013.01); *G06T 11/005* (2013.01)

(58) Field of Classification Search
  CPC ..... A61B 6/469; A61B 6/4085; A61B 6/0487; A61B 8/488; A61B 6/025; A61B 6/5229; A61B 6/102; A61B 6/10; A61B 6/4435; A61B 6/4441; A61B 6/547; A61B 6/4291; A61B 6/484; A61B 6/582; A61B 6/584; A61B 6/587; A61B 6/588; A61B 6/02; A61B 6/585; G06T 11/006; G06T 11/005; G06T 2211/408; G06T 2211/412; G06T 7/001; G06T 2200/04; G06T 2207/30164; G06T 2207/10081; G06T 7/11; G06T 7/50; G06T 7/0004; G06T 7/70; G06T 7/60; G06T 7/194; G01N 23/20008; G01N 2223/33; G01N 23/046; G01N 23/041; G01N 23/04; G01N 2223/303; G01N 33/0006; G01N 21/274; G01N 21/314; G01N 21/61; G01N 21/31; G01N 21/59; G01N 2201/1218; G01N 2021/3166; G01N 2201/1215; G01N 2201/127; G01N 23/10; G01N 23/083; G01N 23/087; G01N 23/20; A61N 5/1049; A61N 5/1081; A61N 5/1048; A61N 5/1071; G01B 15/04; G01T 7/005; G01V 13/00; G01V 5/224; G01V 5/271; G01V 5/226; H04N 5/3205
  USPC .......................................... 378/4, 9, 19, 62
  See application file for complete search history.

(56) References Cited

U.S. PATENT DOCUMENTS

| | | | |
|---|---|---|---|
| 8,126,114 | B2 | 2/2012 | Naylor |
| 8,396,598 | B2 | 3/2013 | Sutherland et al. |
| 9,044,190 | B2 | 6/2015 | Rubner et al. |
| 9,370,332 | B2 | 6/2016 | Paladini et al. |
| 9,445,713 | B2 | 9/2016 | Douglas et al. |
| 10,173,078 | B2 | 1/2019 | Maurer, Jr. et al. |
| 10,573,032 | B2 | 2/2020 | Xu et al. |
| 10,945,695 | B2 | 3/2021 | Zhou |
| 11,039,806 | B2 | 6/2021 | Zhou |
| 2004/0249260 | A1* | 12/2004 | Wang ................. G01R 33/4808 600/407 |
| 2011/0142316 | A1 | 6/2011 | Wang et al. |
| 2014/0198893 | A1* | 7/2014 | Badawi ................ G01N 23/046 378/19 |
| 2014/0270070 | A1* | 9/2014 | Spahn ................... A61B 6/484 378/62 |
| 2018/0018757 | A1 | 1/2018 | Suzuki |
| 2018/0279993 | A1 | 10/2018 | Crawford |
| 2019/0150865 | A1 | 5/2019 | Johnson et al. |
| 2019/0156523 | A1* | 5/2019 | Wang .................... G06T 11/003 |
| 2019/0251713 | A1* | 8/2019 | Chen ..................... A61B 6/482 |
| 2019/0323946 | A1* | 10/2019 | Myers .................... G01N 21/17 |
| 2020/0003703 | A1* | 1/2020 | Zavagno .............. G01N 23/083 |
| 2020/0138520 | A1 | 5/2020 | Noble et al. |
| 2020/0311490 | A1 | 10/2020 | Lee |
| 2021/0000432 | A1 | 1/2021 | Fortuna |

\* cited by examiner

ROBOTIC ARM-BASED CLINICAL MICRO-CT SYSTEM AND METHOD

CROSS REFERENCE TO RELATED APPLICATION(S)

This application claims the benefit of U.S. Provisional Application No. 63/275,616, filed Nov. 4, 2021, U.S. Provisional Application No. 63/323,751, filed Mar. 25, 2022, and U.S. Provisional Application No. 63/399,346, filed Aug. 19, 2022, which are incorporated by reference as if disclosed herein in their entireties.

GOVERNMENT LICENSE RIGHTS

This invention was made with government support under award numbers CA237267, and EB026646, both awarded by the National Institutes of Health. The government has certain rights in the invention.

FIELD

The present disclosure relates to a clinical micro-CT system and method, in particular to, a robotic arm-based clinical micro-CT system and method.

BACKGROUND

Conventional medical CT (computed tomography) is used to provide images of regions a human body. Medical CT may be used to image a variety of middle and inner ear pathologies, but is limited by suboptimal image resolution at the dimensions of, for example, middle and inner ear structures. Micro-CT systems are used in preclinical research but are less so in clinical applications. Clinical micro-CT imaging configured for clinical applications, may provide relatively better image resolution but is limited by challenges associated with interior tomography.

SUMMARY

In some embodiments, there is provided a micro-CT (computed tomography) apparatus. The micro-CT apparatus includes an x-ray source coupled to a source robotic arm, an x-ray detector coupled to a detector robotic arm, and a computing device. The computing device includes a data acquisition module and a reconstruction module. The data acquisition module is configured to acquire local scan data of a volume of interest (VOI) contained in an imaging object. The reconstruction module is configured to reconstruct an image of the VOI based, at least in part, on the local scan data, and based, at least in part, on background compensation data.

In some embodiments of the micro-CT apparatus, the computing device further includes a registration module configured to determine a local scanning geometry. The local scanning geometry is determined based, at least in part, on global scan data of the imaging object. The global scan data includes the VOI and has an associated global scanning geometry. The local scan data is captured for the local scanning geometry.

In some embodiments of the micro-CT apparatus, the computing device further includes a background module configured to estimate a background attenuation of the local scan data. The background attenuation corresponds to the background compensation data.

In some embodiments of the micro-CT apparatus, the registration module is further configured to determine a relative geometry between the global scanning geometry and the local scanning geometry based, at least in part, on a surface model of at least a portion of the imaging object. The VOI is located relative to the surface.

In some embodiments of the micro-CT apparatus, the x-ray source includes a micro-focus tube, and the x-ray detector comprises a photon-counting detector.

In some embodiments of the micro-CT apparatus, the computing device further includes a refinement module configured to perform bias correction.

In some embodiments of the micro-CT apparatus, the reconstructed image has a resolution of at least 50 micrometers ($\mu$m).

In some embodiments, there is provided a micro-computed tomography (CT) system. The micro-CT system includes a medical CT scanner, and a micro-CT apparatus. The medical CT scanner is configured to perform a global scan of an imaging object. The micro-CT apparatus includes an x-ray source coupled to a source robotic arm, an x-ray detector coupled to a detector robotic arm, and a computing device. The computing device includes a data acquisition module and a reconstruction module. The data acquisition module is configured to acquire local scan data of a volume of interest (VOI) contained in the imaging object. The reconstruction module is configured to reconstruct an image of the VOI based, at least in part, on the local scan data, and based, at least in part, on background compensation data.

In some embodiments of the micro-CT system, the computing device further includes a registration module configured to determine a local scanning geometry. The local scanning geometry is determined based, at least in part, on global scan data of the imaging object. The global scan data includes the VOI and has an associated global scanning geometry. The local scan data is captured for the local scanning geometry.

In some embodiments of the micro-CT system, the computing device further includes a background module configured to estimate a background attenuation of the local scan data. The background attenuation corresponds to the background compensation data.

In some embodiments of the micro-CT system, the registration module is further configured to determine a relative geometry between the global scanning geometry and the local scanning geometry based, at least in part, on a surface model of at least a portion of the imaging object, the VOI located relative to the surface.

In some embodiments of the micro-CT system, the x-ray source includes a micro-focus tube, and the x-ray detector comprises a photon-counting detector.

In some embodiments of the micro-CT system, the computing device further includes a refinement module configured to perform bias correction.

In some embodiments, the micro-CT system further includes an optical surface scanner.

In some embodiments, there is provided a method of clinical micro-computed tomography (CT). The method includes emitting, by an x-ray source, x-ray photons, the x-ray source coupled to a source robotic arm; detecting, by an x-ray detector, at least some of the emitted x-ray photons, the x-ray detector coupled to a detector robotic arm. The method further includes acquiring, by a data acquisition module, local scan data of a volume of interest (VOI) contained in an imaging object. The method further includes reconstructing, by a reconstruction module, an image of the VOI based, at least in part, on the local scan data, and based, at least in part, on background compensation data.

In some embodiments, the method further includes determining, by a registration module, a local scanning geometry. The local scanning geometry is determined based, at least in part, on global scan data of the imaging object. The global scan data includes the VOI and has an associated global scanning geometry. The local scan data is captured for the local scanning geometry.

In some embodiments, the method further includes estimating, by a background module, a background attenuation of the local scan data. The background attenuation corresponds to the background compensation data.

In some embodiments, the method further includes determining, by the registration module, a relative geometry between the global scanning geometry and the local scanning geometry based, at least in part, on a surface model of at least a portion of the imaging object, the VOI located relative to the surface.

In some embodiments, the method further includes performing, by a refinement module, bias correction.

In some embodiments, the x-ray source includes a micro-focus tube, and the x-ray detector comprises a photon-counting detector.

In some embodiments, there is provided a computer readable storage device. The computer readable storage device has stored thereon instructions that when executed by one or more processors result in the following operations including the method.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Although the following Detailed Description will proceed with reference being made to illustrative embodiments, many alternatives, modifications, and variations thereof will be apparent to those skilled in the art.

DETAILED DESCRIPTION

Generally, this disclosure relates to a robotic arm-based clinical micro-CT (CMCT) apparatus, method and/or system. In the following, a robotic arm-based clinical micro-CT apparatus, system and method are described using as an example, the clinical practice of otology and neurotology. It should be noted that a robotic arm-based clinical micro-CT apparatus, system and method, according to the present disclosure, may be utilized for other clinical imaging applications, within the scope of the present disclosure.

As used herein, medical CT corresponds to CT with a spatial resolution on the order of tenths of millimeters (mm). In one nonlimiting example, a medical CT image may have spatial resolution of 0.3 mm. The terms "medical CT", "clinical CT" (without micro-) and/or "conventional CT" are used interchangeably. As used herein, "micro-CT" corresponds to CT with spatial resolution of the order of tens of micrometers (μm). As used herein, a "clinical micro-CT" corresponds to a micro-CT configured to image regions of a human body. In one nonlimiting example, a clinical micro-CT image may have a spatial resolution of 50 μm.

In the clinical practice of otology and neurotology, medical imaging is used for evaluation and treatment of many diseases. Temporal bone CT may be used for otological imaging. Disorders or therapies where temporal bone CT may be used as an adjunct to surgical management, e.g., for diagnosis or planning, include, but are not limited to chronic otitis media, otosclerosis, temporal bone fracture, congenital aural atresia, cochlear implantation, dehiscent superior semicircular canal, congenital labyrinthine dysplasia, and labyrinthine fistula. In cochlear implantation, an ability to localize electrodes and depict their three-dimensional (3D) anatomical environment in vivo aids understanding variations in threshold, discomfort level, and channel interaction.

Medical CT may be used to image a variety of middle and inner ear pathologies but may not provide adequate image resolution. A precise diagnosis may be unavailable until direct assessment during otologic surgery allows visual inspection and palpation of the ossicular chain. Improved image resolution of pre- and post-operative inner ear imaging may allow a relatively more detailed analysis of cochlear morphometry and its relationship to an implanted electrode array. Improved spatial resolution without compromising other image quality indices and at a minimized radiation dose level may thus benefit these as well as other research and clinical applications.

A robotic arm-based X-ray imaging system may be configured with an X-ray source coupled to a first ("source") robotic arm and an X-ray detector coupled to a second ("detector") robotic arm. The X-ray source may include, but is not limited to, a micro-focus X-ray tube, a dual energy CT source, e.g., a single-source X-ray source configured to emit an X-ray beam in two energy spectra, or a single energy spectrum source. The X-ray detector may include, but is not limited to, an energy-integrating detector (EID), a current integrating detector (CID), a dual-layer detector, and a photon-counting detector (PCD). In one nonlimiting example, each robotic arm may be configured with six degrees of freedom. A robotic-arm-based X-ray imaging system, according to the present disclosure, may provide flexibility in scanning and may facilitate a variety of scanning trajectories. The scanning trajectories may be task-specific and may include relatively diverse tasks targeting various organs and locations.

X-ray photon-counting detectors (PCDs) may enable relatively high-resolution (HR) and low-noise imaging, thus providing a spectral dimension to raw data and a corresponding improvement in CT performance. Different from an energy-integrating detector (EID), PCD works in a pulse-counting mode and directly converts individual X-ray photons into corresponding charge signals which are then sorted into different energy bins based on respective pulse heights. Thus, an intensity and wavelength information of incoming photons may be simultaneously obtained. Advantageously, PCDs generally do not suffer from electronic noise effects and may provide a relatively small effective pixel size; e.g., around 0.11 mm×0.11 mm. As used herein, "around" and "approximately" correspond to within ±10 percent (%). PCDs allow applying selected weights to polychromatic photons for improved contrast and dose efficiency. Additionally or alternatively, an energy discrimination ability of PCDs may help reduce beam hardening and metal artifacts, and/or may enable K-edge imaging and material decomposition.

Micro-focus X-ray tubes may be used with PCDs in micro-CT applications, according to one embodiment of the present disclosure. In one nonlimiting example, a microfocus X-ray tube may include electron emitting and receiving constructs (i.e., portions). The X-ray tube is configured to emit X-ray photons. The receiving portion may contain an anode with a photoconductor. The emission portion may contain a backplate, a substrate, a cathode, a gate electrode, and an array of field emission electron sources. In another example, a microstructured array anode target (MAAT) X-ray source may be configured to provide a relatively higher flux than an ordinary X-ray source in phase contrast imaging applications. It is contemplated that such technologies could be combined into a micro-focus X-ray tube for temporal bone CT imaging; for example, with a focal spot size of about 0.1 mm or less, corresponding to a PCD element size.

Generally, this disclosure relates to a robotic arm-based clinical micro-CT apparatus, method and/or system. The robotic arm-based clinical micro-CT apparatus, method and/or system, according to the present disclosure, may include a clinical micro-CT scanner. In an embodiment, the robotic arm-based clinical micro-CT apparatus may include the clinical micro-CT scanner and a computing device. In one embodiment, the clinical micro-CT scanner may include a micro-focus tube, and a PCD, each mounted on a robotic arm. The clinical micro-CT apparatus, e.g., clinical micro-CT scanner, may be configured to perform interior tomography. In some embodiments, the clinical micro-CT apparatus, e.g., computing device, may be configured to implement deep learning.

In some embodiments, a clinical micro-CT (CMCT) system may include the clinical micro-CT apparatus combined with or coupled to a clinical CT scanner. A clinical micro-CT system may thus include the clinical micro-CT scanner, and the computing device and may include the clinical CT scanner. In some embodiments, the clinical micro-CT scanner and/or apparatus may be used separately, i.e., may not be coupled to the clinical CT scanner.

In an embodiment, a CMCT workflow may begin with a conventional volumetric scan (i.e., "global scan") of a patient, and may then proceed to a subsequent image analysis session configured to plan a micro-CT imaging trajectory. The planning may be performed by a trained person and/or an intelligent algorithm. The patient may then be positioned in a robotic scanning space for an interior photon-counting micro-CT scan (i.e., "local scan"). The robotic scanning space may be adjacent to the medical CT scanning space. In some embodiments, the workflow may include registration to the global scan. The interior scan may be configured to target a region of interest (ROI) within the global scan data, using a relatively small detector panel. As used herein, ROI may be two dimensional (2D) or three-dimensional (3D). Volume of interest (VOI) corresponds to a 3D ROI. The scanning trajectory may be configured to enhance image quality. In some embodiments, to facilitate relatively accurate registration between the global scan data/images and local scan data/images, an optical 3D surface scanner may be used at the start of the local scan. As used herein, "global scan" and "global scan data" correspond to a medical CT scan and medical CT scan data, respectively. As used herein, "local scan" and "local scan data" correspond to a clinical micro-CT scan and clinical micro-CT scan data, respectively. "Local scan" and "interior scan" are used interchangeably. "Scan data", "projection data" and "sinogram" are used interchangeably. In some embodiments, the optical 3D surface scanner may be configured to continue to monitor the head movement of the patient during the local scan to facilitate motion compensation.

In some embodiments, a relatively high resolution (HR) local image reconstruction of the ROI (i.e., local or interior scan data) may include background compensation of the HR local/interior scan utilizing corresponding global scan data. Advantageously, a subsequent interior reconstruction may include a relatively small portion of the sinogram, utilizing relatively less memory space and computational time. In some embodiments, for image quality enhancement at relatively reduced X-ray radiation doses, one or more deep learning techniques may be utilized in one or more reconstruction stages, e.g., projection deblurring, image denoising and super-resolution, beam hardening correction and/or material decomposition.

In an embodiment, there is provided a micro-CT (computed tomography) apparatus. The micro-CT apparatus includes an x-ray source coupled to a source robotic arm, an x-ray detector coupled to a detector robotic arm, and a computing device. The computing device includes a data acquisition module and a reconstruction module. The data acquisition module is configured to acquire local scan data of a volume of interest (VOI) contained in an imaging object. The reconstruction module is configured to reconstruct an image of the VOI based, at least in part, on the local scan data, and based, at least in part, on background compensation data. In one embodiment, the x-ray source includes a micro-focus tube, and the x-ray detector includes a photon-counting detector.

Figure 1:
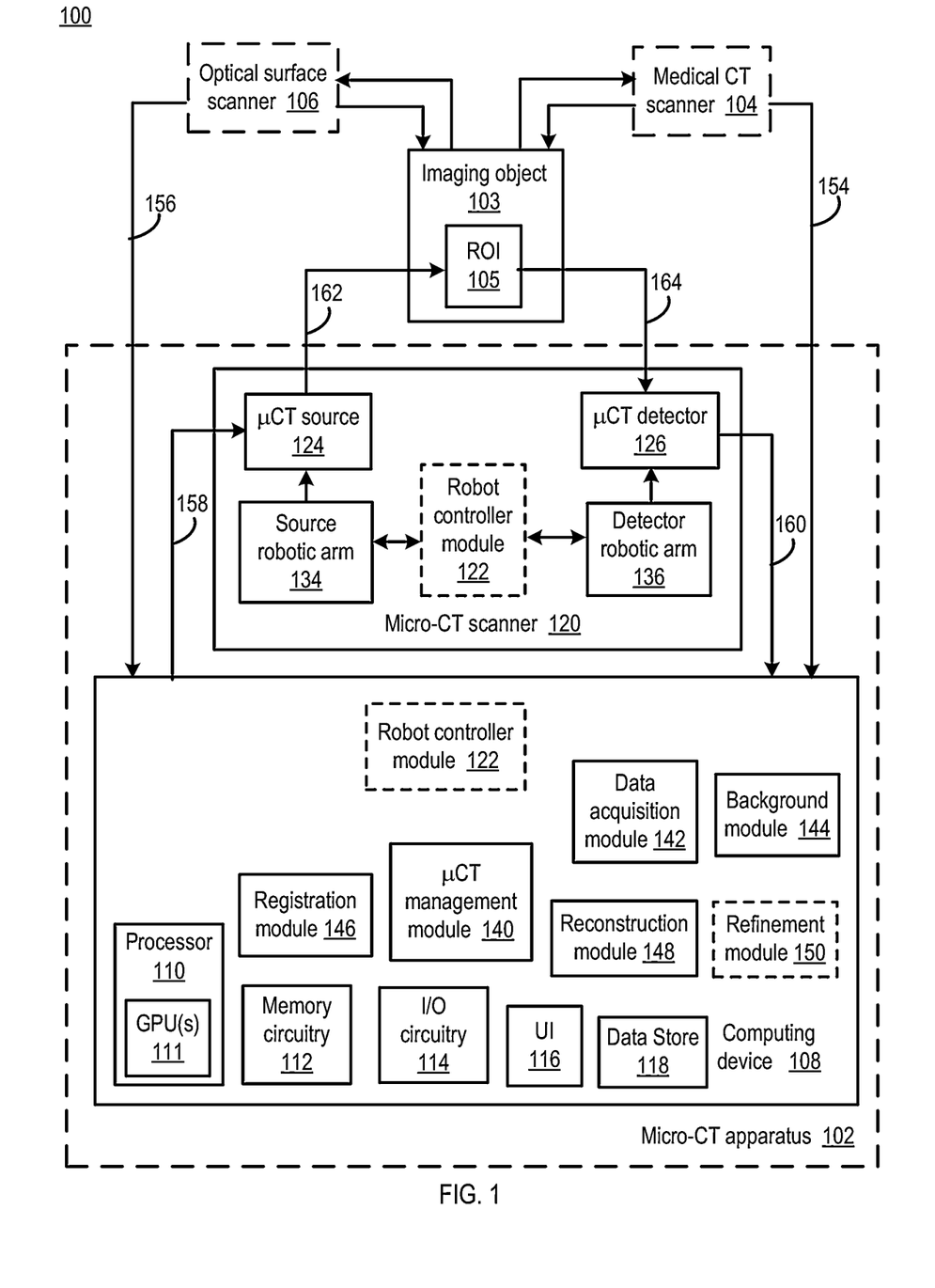
FIG. 1 illustrates a functional block diagram of a clinical micro-computed tomography (CMCT) system, consistent with several embodiments of the present disclosure.

FIG. 1 illustrates a functional block diagram of a clinical micro-CT (CMCT) system 100, consistent with several embodiments of the present disclosure. CMCT system 100 includes a clinical micro-CT apparatus 102, and an imaging object 103. The imaging object 103 includes a region of interest 105 that corresponds to a portion of the imaging object 103. For example, the imaging object 103 may include a test subject, e.g., a patient, a portion of the patient or a patient internal organ, and the ROI 105 may correspond to a portion of the patient, a patient internal organ or a portion of a patient internal organ.

CMCT system 100 may include a medical CT scanner 104 and/or and an optical surface scanner 106. Micro-CT apparatus 102 includes a computing device 108 and a micro-CT scanner 120 (i.e., a robotic micro-CT scanner). Computing device 108 includes processor circuitry 110, memory circuitry 112, input/output (I/O) circuitry 114, a user interface (UI) 116 and a plurality of functional modules. In some embodiments, processor circuitry 110 may include one or more graphics processing units (GPU(s)) 111. Processor circuitry 110 may be configured to perform operations of one or more modules of the micro-CT apparatus 102, as described herein. Memory circuitry 112 and/or data store 118 may be configured to store modules and data, as described herein. I/O circuitry 114 may be configured to communicate with medical CT scanner 104, optical surface scanner 106 and/or micro-CT scanner 120. UI 116 may include one or more elements configured to capture user input and/or provide output data to the user. UI 116 may thus include one or more of a display (including a touch sensitive display), a loudspeaker, a keyboard, a mouse, a touchpad, a microphone, a camera, etc.

Micro-CT apparatus 102, e.g., micro-CT scanner 120, includes a micro-CT (µCT) source 124, a micro-CT (µCT) detector 126, a source robotic arm 134, and a detector robotic arm 136. Micro-CT apparatus 102, e.g., computing device 108, includes a micro-CT (µCT) management module 140, a data acquisition module 142, a background module 144, a registration module 146, and a reconstruction module 148. In some embodiments, micro-CT apparatus 102, e.g., computing device 108, may include a refinement module 150. In some embodiments, micro-CT scanner 120 may include a robot controller module 122. In some embodiments, the robot controller module 122 may be included in computing device 108.

In operation, the medical CT scanner 104 may be configured to perform a global scan of imaging object 103, e.g., a patient head. A known CT reconstruction technique (e.g., filtered back projection (FBP)) can be used to reconstruct head slices corresponding to imaging object 103. Head slices may include ROI 105, e.g., an inner ear ROI. The patient corresponding to imaging object 103 may then be positioned relative to the micro-CT apparatus 102, e.g., relative to the micro-CT scanner 120, or the robotic micro-CT apparatus 102 may be positioned relative to the patient. As used herein, "micro-CT apparatus" and "robotic micro-CT apparatus" are used interchangeably. As used herein, "micro-CT scanner" and "robotic micro-CT scanner" are used interchangeably.

The micro-CT source 124 may be coupled (e.g., mechanically) to the source robotic arm 134. The micro-CT detector 126 may be coupled (e.g., mechanically) to the detector robotic arm 136. The robot controller module 122 is configured to control movement of the robotic arms 134, 136 and thus, position and/or orientation of the micro-CT source 124 and the micro-CT detector 126. The micro-CT source 124 corresponds to an X-ray source and the micro-CT detector 126 corresponds to an X-ray detector, respectively. The X-ray source 124 may include, but is not limited to, a micro-focus X-ray tube, a dual energy CT source, or a single energy spectrum source. The X-ray detector 126 may include, but is not limited to, an energy-integrating detector (EID), a current integrating detector (CID), a dual-layer detector, and a photon-counting detector (PCD). In an embodiment, the X-ray source 124 may include a micro-focus tube for relatively high spatial resolution imaging. In an embodiment, the X-ray detector 126 may include a flat-panel PCD (pulse counting detector) configured for material decomposition and tissue characterization.

The robotic arms 134, 136 may be configured to perform a scan along an arbitrary trajectory including, but not limited to, a circular trajectory and/or spiral trajectory. The computing device 108, and associated modules are configured to manage operation of the robotic micro-CT apparatus 102 including, but not limited to, motion of the robotic arms 134, 136, positioning and controlling the X-ray source 124, positioning and capturing data from the X-ray detector 126, etc. The computing device 108, e.g., robot controller module 122, may be configured to provide instructions to the robotic arms, X-ray source and detector. The computing device 108, e.g., data acquisition module 142, may be configured to acquire raw data from the micro-CT detector 126. Thus, each robotic arm 134, 136 may include and/or be coupled to a control device, configured to receive commands from the computing device 108 and drive robotic arm 134, 136 servo systems.

In one nonlimiting example, the robotic arms 134, 136 may be 6-axis robotic arms with a position repeatability of on the order of ten micrometers (µm). For example, the position repeatability may be at least 30 µm. However, this disclosure is not limited in this regard. In one nonlimiting example, the micro-CT system may achieve a spatial resolution of at least 50 µm.

In one nonlimiting example, the X-ray source 124 may include a micro-focus X-ray tube that is configured with an adjustable focal spot size. For example, the adjustable focal spot sizes may include, but are not limited to, 7, 20, and 50 µm. In one nonlimiting example, the X-ray source 124 anode target material may be Tungsten, the tube window may be made of Beryllium of 0.2 mm thickness, and the effective cone beam angle may be 43 degrees. However, this disclosure is not limited in these regards. A weight of the X-ray source 124 may be on the order of 10 kilograms, e.g., 13.5 kg. However, this disclosure is not limited in this regard. In an embodiment, the X-ray detector 126 may include or correspond to a PCD. In one nonlimiting example, the X-ray detector 126 may have a continuously sensitive surface that include an array of 5×5 detector tiles of 1280×1280 pixels. Each tile may include a single hybrid detector (256×256 pixels) with an edgeless CdTe (Cadmium Tellurium) sensor. Each pixel is configured to count a respective number of X-ray photons, thus allowing a relatively large dynamic range. The X-ray detector 126 is configured to support a plurality of energy thresholds. A spatial resolution may be defined by a detector pitch. In one nonlimiting example, the detector pitch may be 55 µm. However, this disclosure is not limited in these regards.

In other words, for the example X-ray detector 126, the imaging sensor is configured to cover a 7 cm×7 cm area. The detector weighs 3.3 kg and can be carried by an appropriately sized robotic arm. Operation of the detector in a 2×2 binning mode provides an image resolution at or near 50 µm, with diameter of the volume of interest (VOI) of 3.5 cm, assuming a magnification factor of 2. Additionally or alternatively, for another example X-ray detector 126, the detector tile pixels may include a plurality, e.g., two, integrated 12-bit digital counters and two energy discrimination thresholds. Operating the X-ray detector 126 in a 2×2 binning mode provides 8 spectral bins for data collection in a single scan. However, this disclosure is not limited in these regards.

As is known, radiation dose is mainly determined by the tube voltage, current and exposure period. With the use of the PCD, there is no electronic noise when recording projection data but Poisson noise cannot be avoided. In the interior scanning mode, the X-ray source 124 may radiate about 1/10 of the diameter of the field of view. It is contemplated that increasing image resolution by four times (for example, from approximately 200 µm to 50 µm) may increase radiation dose a relatively large amount (e.g., by two orders of magnitude). It is contemplated that the radiation dose may be reduced by an order of magnitude by using a deep learning-based low-dose CT imaging techniques. It is estimated that a conventional head CT dose may be maintained for an interior micro-CT scan while achieving about 50 µm resolution.

Figure 2:
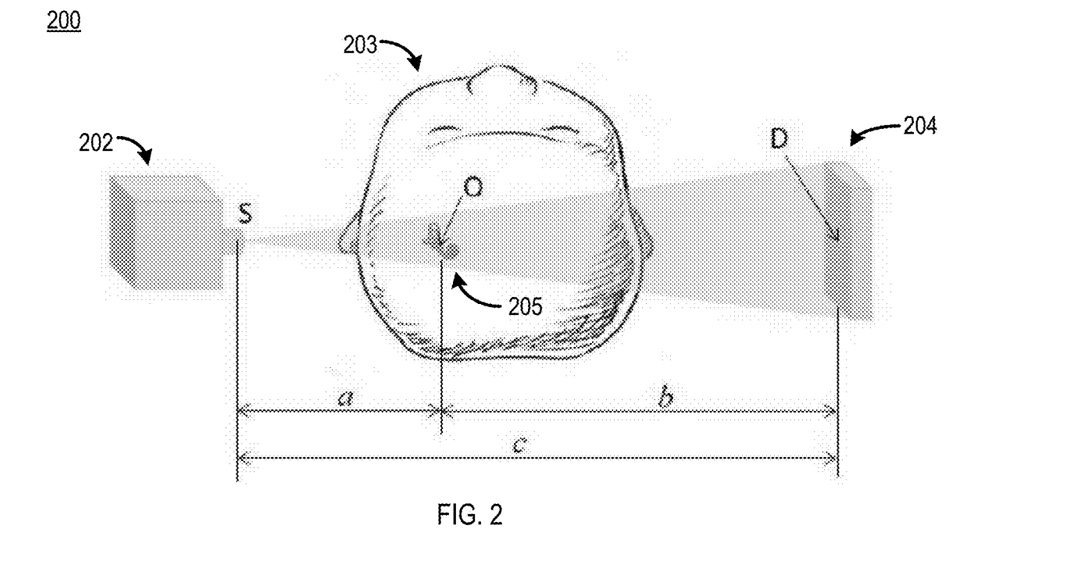
FIG. 2 is a sketch illustrating a geometry of a micro-CT imaging system, according to an embodiment of the present disclosure.

FIG. 2 is a sketch 200 illustrating a geometry of a micro-CT imaging system, according to an embodiment of the present disclosure. Sketch 200 is configured to illustrate a relationship between system geometry and spatial resolution for a micro-CT system, according to several embodiments of the present disclosure. Sketch 200 includes micro-CT source 202, a micro-CT detector 204 and an imaging object 203 that contains an ROI 205. A focal spot size of the micro-CT source 202 corresponds to a PCD element size of the micro-CT detector 204. A center of the focal spot of the source 202 may be defined as S, a center of the detector 204 as D, and a rotation center as O corresponding to a center of a VOI 205. The focal spot, center of the detector and rotation center may generally be aligned. A distance a is the source 202 to VOI 205 distance, a distance b is the VOI 205 to detector 204 distance, and a distance c is the source 202 to detector 204 distance. Geometric magnification factors M and M' are c/a and c/b for the focal spot, S, and a detector aperture, D, respectively. A spatial resolution r of corresponding imaging system can be approximated as a convolution of the detector size d and the focal spot size x, respectively, scaled by M and M' as:

$$r = \sqrt{\left(\frac{x}{M}\right)^2 + \left(\frac{d}{M'}\right)^2} \quad (1)$$

In one nonlimiting example CMCT system design, x may be less than or equal to 50 μm, and d may be equal to about 110 μm (related to 2×2 binning). The source 202 to VOI 205 distance may in the range 150 to 250 mm, and the VOI 205 to detector 204 distance may be in a same range. The magnification factor can be adjusted from 1.60 to 2.67 with the imaging field of view varying from 26 to 44 mm in diameter. Accordingly, the spatial resolution of a system, according to the present disclosure may be at or near 50 μm.

Figure 3:
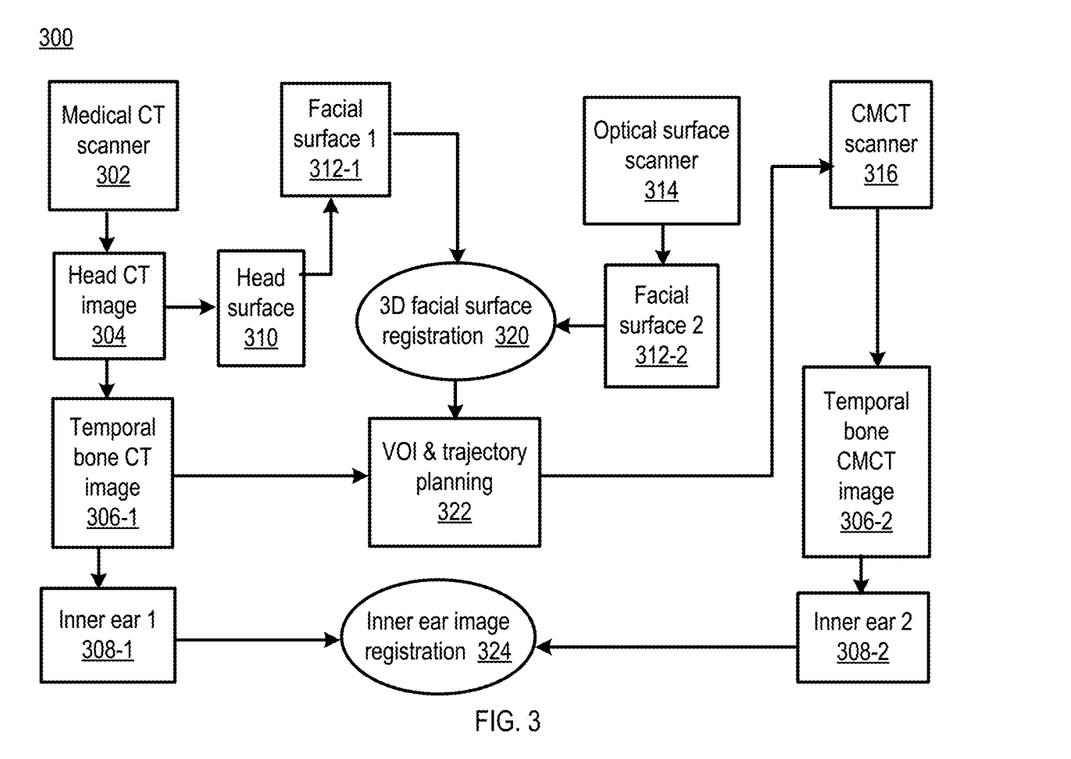
FIG. 3 is a functional block diagram of an image registration system, according to an embodiment of the present disclosure.

FIG. 3 is a functional block diagram 300 of an image registration system, according to an embodiment of the present disclosure. Image registration system 300 includes a medical CT scanner 302, an optical surface scanner 314 and a clinical micro-CT (CMCT) scanner 316. The medical CT scanner 302 may correspond to the medical CT scanner 104, the optical surface scanner 314 may correspond to the optical surface scanner 106 and the clinical micro-CT (CMCT) scanner 316 may correspond to the micro-CT scanner 120, of FIG. 1.

In operation, global projection data and local projection data may be obtained in different scanning geometries. The medical CT scanner 302 may be configured to generate a head CT image 304. A head surface 310 may be determined based, at least in part, on the head CT image 304, and a first facial surface 312-1 may be identified based, at least in part, on the head surface 310. A temporal bone CT image 306-1 may be generated based, at least in part, on the head CT image 304 and a first inner ear 308-1 position may be determined based, at least in part, on the temporal bone CT image 306-1. The optical surface scanner 314 may be configured to determine a second facial surface 312-2. A 3D facial surface registration 320 may be performed based, at least in part, on the facial surfaces 312-1, 312-2. VOI and trajectory planning 322 may be performed based, at least in part, on the temporal bone CT image 306-1 and the 3D facial surface registration 320.

The CMCT scanner 316 may be configured to receive the VOI and trajectory planning 322 information. The CMCT scanner 316 may then generate a temporal bone CMCT image 306-2. A second inner ear 308-2 position may be determined based, at least in part, on the temporal bone CMCT image 306-2. An inner ear image registration 324 may then be performed based, at least in part, on the inner ear positions 308-1, 308-2.

Thus, the clinical CT scanner 302 is configured to obtain a 3D image (i.e., head CT image data 304) of a patient. The patient may wear one or more landmarks such as, for example, a relatively firmly-attached helmet. A boundary detection technique may be configured to extract a facial/helmet surface (e.g., a head surface 310 and/or a first facial surface 312-1). Key points for mesh generation may be extracted, as a basis for image registration. It may be appreciated that an inner ear (corresponding to inner ear 308-1) and the first facial surface 312-1 are generally in a rigid relation. One nonlimiting example of 3D surface scanners includes a laser scanner Micro-Epsilon LLT2910-100. However, this disclosure is not limited in this regard. In one nonlimiting example, a height range may be set from 125 to 390 mm, and a width range may be fixed to 143.5 mm, with spatial resolution of 12 μm, and at a profiling frequency of 300 Hz.

Continuing with the example laser scanner, its relatively compact size of 96 mm×85 mm×33 mm and low weight of 380 grams are useful for static, dynamic and robotic applications. A wavelength of the semiconductor laser may switchable between 658 nm (red) and 405 nm (blue). In one nonlimiting example, the optical scanner and CMCT scanner robotic arms may be mounted on a same pedestal so that they share the same coordinate system. The optically scanned patient head surface may be registered with the clinical CT originated head surface. Then, the coordinate conversion may performed to delineate a VOI for a robotic micro-CT scan. The temporal bone data and images by medical CT and micro-CT may then be registered and fused to facilitate imaging performance.

Thus, image registration may be performed based, at least in part, on medical CT scanner image data, optical 3D surface scanner data and CMCT scanner image data.

As is known, the CT interior problem is not uniquely solvable in an unconstrained space. By introducing additional prior knowledge on the image to be reconstructed; e.g., an interior sub-region with known attenuation values or a piece-wise constant model of underlying images, the image reconstruction from local projection profiles that are truncated on both sides may become uniquely solvable. However, those assumptions often may not exactly hold in practical cases, and may result in, for example, shifting and cupping in reconstructed attenuation values. In an embodiment, a low-resolution (LR) global CT scan may be utilized to estimate a background attenuation in a sinogram of an HR local scan that includes a surrounding volume of the VOI, and a relatively accurate HR local reconstruction of the VOI may be obtained.

A transformation between an underlying/reconstructed image and its projection data is linear and invertible, and an underlying image may be partitioned into two parts: the region of interest and the background. Given the sinogram of the background $P_{background}$ and the global sinogram $P_{global}$, a relatively pure sinogram of a region of the interest (ROI) $P_{ROI}$ may be obtained as follows. The sinogram of the ROI may be determined based, at least in part, on the global sinogram and the sinogram of the background as:

$$P_{ROI} = P_{global} - P_{background}, \quad (2)$$

Eq. 2 becomes nontrivial with laterally truncated projection data. Let trunc(•) denote the truncation operation. Eq. 2 then may be written as:

$$\text{trunc}(P_{ROI}) = \text{trunc}(P_{global}) \text{trunc}(P_{background}), \quad (3)$$

where trunc($P_{global}$) corresponds to a local scan $P_{local}$. By intentionally letting the local scan cover the ROI, the truncated parts of $P_{ROI}$ are all zeros, yielding:

$$P_{ROI} = P_{local} - \text{trunc}(P_{background}) \quad (4)$$

Thus, the ROI within a local scan can be accurately reconstructed from the laterally truncated scan after background subtraction. It may be appreciated that such compensation is configured to improve the stability of interior tomography.

For a CMCT system, according to the present disclosure, a VOI may be relatively accurately reconstructed at relatively high resolution, given the HR local projection dataset $P_{local}^{HR}$ and an appropriate background estimation. Given a prior LR CT scan of the object $P_{global}^{LR}$, e.g., from medical CT scanner 104, the LR background estimation $P_{background}^{LR}$ can be obtained as described herein. The LR background estimation may then be used to approximate the HR background via interpolation, based, at least in part, on an assumption that residual high-frequency background estimation errors will mostly cancel out during the integration, making an accuracy of the LR estimation adequate. As used herein, "background compensation data" corresponds to background estimation. The background estimation may be low resolution (LR), high resolution (HR), and/or truncated, as described herein.

It may be appreciated that, in clinical applications, a standard (relatively low resolution) global CT scan may be first performed. Those regions with possible pathology or of physiologic importance may then be further examined with a local micro-CT scan, which provides a HR local/interior reconstruction of a VOL The prior information obtained through the global CT scan may then be utilized to help the interior image reconstruction (at relatively high resolution).

Turning again to FIG. 1, the µCT management module 140 may be configured to manage operation of the micro-CT apparatus 102. The medical CT scanner 104 may be configured to scan the imaging object 103 and to generate global scan data 154, that corresponds to the imaging object 103. The global scan data 154 may then be provided to the computing device 108, e.g., to the µCT management module 140 and/or the background module 144. The optical surface scanner 106 may be configured to optically scan the imaging object 103, and to provide 3D surface registration data 156, e.g., to the µCT management module 140 and/or the registration module 146. The global scan data 154 and 3D surface registration data 156 may be stored in the data store 118 by, for example, the µCT management module 140. Thus, global scan data 154 and 3D surface registration data 156 may be acquired, and provided to the micro-CT apparatus 102.

The micro-CT apparatus 102 may then be configured to capture and store local scan data. The µCT management module 140 may be configured to provide one or more commands to the robot controller module 122, to control positions and orientations of the µCT source 124 and the µCT detector 126 relative to the ROI 105. The positions and orientations may be determined based, at least in part, on the registration data 156 and predetermined scanning trajectories, as described herein. The position and orientation of the µCT source 124 and the position and orientation of the µCT detector 126 may be controlled by the source robotic arm 134 and the detector robotic arm 136, respectively, based, at least in part, on control inputs from the robot controller module 122. The µCT management module 140 may be configured to provide control input 158 to the µCT source 124, and to capture a corresponding detector output 160 from the µCT detector 126. The detector output 160 corresponds to local scan data that may be stored in the data store 118, and may be utilized by the local scan module 142, as described herein. In one nonlimiting example, the µCT source 124 may correspond to a micro-focus X-ray source and the µCT detector 126 may correspond to a PCD, as described herein. Thus, local scan data 160 may be acquired, and provided to the micro-CT apparatus 102.

Figure 4:
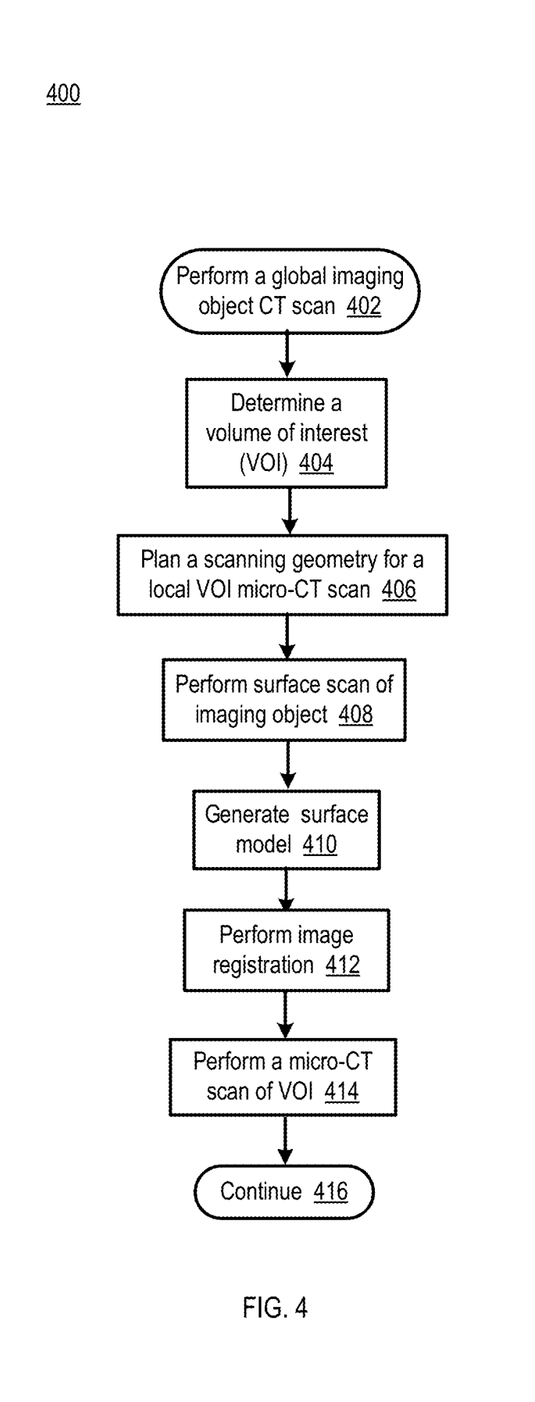
FIG. 4 a flowchart of imaging object and region of interest scanning operations according to various embodiments of the present disclosure.

FIG. 4 a flowchart 400 of imaging object and region of interest scanning operations according to various embodiments of the present disclosure. In particular, the flowchart 400 illustrates global (i.e., medical CT) scanning of an imaging object and local (i.e., micro-CT) scanning of an ROI (e.g., VOI) within the imaging object. The operations may be performed, for example, by the micro-CT apparatus 102 and/or medical CT scanner 104 of FIG. 1.

Operations of this embodiment may begin with performing a global imaging object CT scan at operation 402. A VOI may be determined at operation 404. A scanning geometry for a local VOI micro-CT scan may be planned at operation 406. A surface scan of the imaging object may be performed at operation 408. A surface model may be generated at operation 410. Image registration may be performed at operation 412. A micro-CT scan of the VOI may be performed at operation 414. Program flow may then continue at operation 416.

Thus, in an embodiment, the scanning procedure may include the following operations:

1) Perform a global head CT scan $P_{global}$ with a scanning geometry $G_{global}$;
2) Determine a VOI and then plan a scanning geometry $G_{local}$ for a local micro-CT scan;
3) Scan the patient, i.e., the imaging object, optically with a surface scanner to generate the surface model $S_{local}$ for data/image registration between the global and local scans at the start of the local scan;
4) Perform the micro-CT scan $P_{local}$ following $G_{local}$ based, at least in part, on registration operations, as described herein. During the local scan, the optical scanner may be configured to continuously scan the imaging object, e.g. a patient head, for tracing unconscious head movement. In some embodiments, the imaging object may be scanned aided by optical markers.

Figure 5:
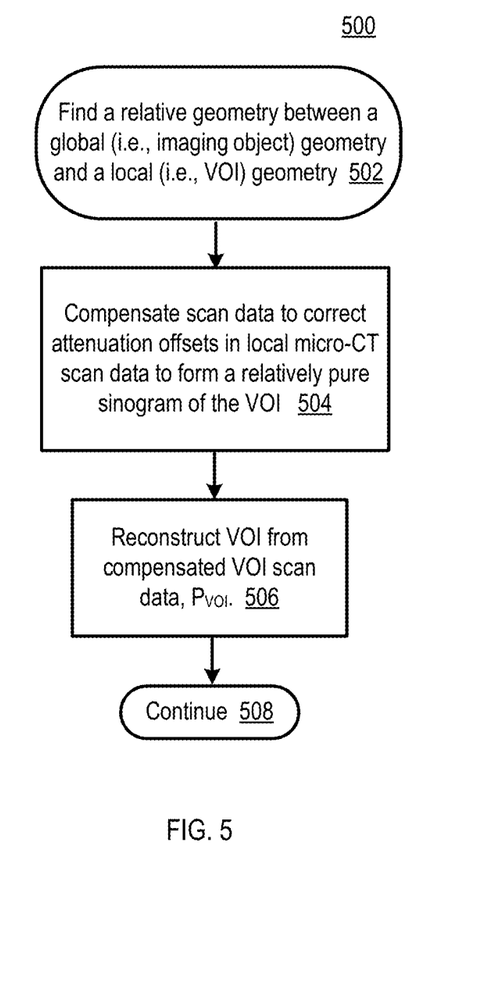
FIG. 5 a flowchart of volume of interest reconstruction operations according to various embodiments of the present disclosure.

FIG. 5 a flowchart 500 of volume of interest (VOI) reconstruction operations according to various embodiments of the present disclosure. In particular, the flowchart 500 illustrates data/image registration, background compensation, and image reconstruction. The operations may be performed, for example, by the micro-CT apparatus 102 and/or medical CT scanner 104 of FIG. 1.

Operations of this embodiment may begin with registration at operation 502. Registration may include finding a relative geometry between a global (i.e., imaging object) geometry and a local (i.e., VOI) geometry. Operation 504 includes scan data compensation. Compensation is configured to correct attenuation offsets in local micro-CT scan data to form a relatively pure sinogram of the VOL Operation 506 includes reconstruction. Reconstruction corresponds to reconstructing the VOI from compensated VOI scan data, $P_{VOI}$. Program flow may then continue at operation 508.

Thus, VOI reconstruction may generally include data/image registration, background compensation, and image reconstruction. In one nonlimiting example, registration module 146 may be configured to perform registration operations, background module 144 may be configured to perform background compensation operations and reconstruction module 148 may be configured to perform image reconstruction. In some embodiments, reconstruction may include bias compensation. Bias compensation may be performed, for example, by refinement module 150. It is contemplated that head movement effects, if any, may be compensated for in the local projections $P_{local}$ using a motion correction technique, e.g., locally linear embedding motion correction, based, at least in part, on data from the optical scanner 106.

1) Registration: Find a relative geometry between $G_{global}$ and $G_{local}$ in reference to a facial surface model $S_{local}$
   a) Reconstruct a global volume $V_{global}$ from $P_{global}$;
   b) Render a surface model $S_{global}$ from the global reconstruction $V_{global}$;
   c) Register the two surface models, $S_{global}$ with $S_{local}$, to align the orientation and position of $S_{global}$ with $S_{local}$. The registration result may then be used to guide the micro-CT scan;
   d) From $P_{local}$, directly reconstruct a volume of interest $V_{local}$ that contains fine structures but may be subject to distorted attenuation values;
   e) Refine the registration parameters (obtained in Operation 1c) in reference to the registration between $V_{global}$ from $P_{local}$;
2) Compensation: Correct the attenuation offsets in $P_{local}$ to form a pure sinogram of the $VOIP_{VOI}$
   a) Set the attenuation values inside VOI to zero in the aligned global reconstruction to form the background volume $V_{background}^{align}$;
   b) Digitally reproject the background volume $V_{background}^{align}$ following the geometry $G_{local}$ to form the LR background estimation $P_{background}^{LR}$;
   c) Interpolate $P_{background}^{LR}$ to the same resolution as the local HR projection $P_{local}$, and obtain $P_{background}^{HR}$;
   d) Truncate $P_{background}^{HR}$ to the same size as $P_{local}$, and obtain trunc $(P_{background}^{HR})$; corresponding to background compensation data;
   e) Correct $P_{local}$ with the estimated attenuation background as $P_{local} - \text{trunc}(P_{background}^{HR})$ to form the pure sinogram of the $VOIP_{VOI}$;
3) Reconstruction: Reconstruct the VOI from $P_{VOI}$ with geometry $G_{local}$ using, for example, a cone-beam reconstruction technique. In some embodiments, the reconstruction technique may include or may be related to a deep learning framework.

Thus, VOI reconstruction may be implemented by micro-CT system 100 and may generally include data/image registration, background compensation, and image reconstruction.

It may be appreciated reconstruction that reconstruction accuracy may be affected by robustness to mis-registration. Mis-registration may be a result of, for example, imperfect hardware components and their suboptimal coordination; i.e., with respect to mismatches in position, orientation and/or scale. The direct effects of these mismatches on the reconstruction process may include, but are not limited to, an isocenter offset, a falsely tilted initial view angle, and an incorrect magnification factor detrimentally affecting the interpolation between the local scan and the re-projection through a globally reconstructed image volume for background estimation. Experimental results suggest that the VOI reconstruction technique, according to the present disclosure is relatively robust with respect to, for example, isocenter misalignment.

It may be appreciated that an effective ROI of reconstruction may be determined by the applied magnification factor, with the regions outside the effective ROI having opposite attenuation shifting as compared to that inside the effective ROI. Different from the distortions observed in the cases of positional and angular misalignments, which are mainly concentrated around a peripheral region, the magnification error causes a global attenuation shift inside the effective ROI. The attenuation shift may be proportional to the magnification mismatch and may be relatively more sensitive than other types of misalignments. This global shift can be mitigated by a bias correction technique, as will be described in more detail below.

A global shift, for example related to magnification errors, may be mitigated with bias correction configured to set an attenuation value of a known region to a target value; e.g., to set an attenuation value corresponding to air to a value at or near zero. Other known values may be used for a similar purpose, for example, an attenuation value obtained from the global reconstruction. Continuing with this example, a relatively flat region may be selected and its corresponding mean value may be determined as a benchmark.

A quantitative metric, may be used to quantify a reconstruction with a misalignment in reference to the ROI in the GT (ground truth), with and without additional bias correction. Quantitative metrics may include, but are not limited to, SSIM (Structural Similarity Index Measure), Peak Signal-to-Noise Ratio (PSNR), MSE (Mean Squared Error) and Root Mean-Squared Relative Error (RMSRE).

In an experiment, an isocenter position, initial angle, and magnification errors were evaluated, with a radius of the ROI set to 21 mm. Experimental results suggested that reconstructions are relatively robust with respect to the isocenter positional and initial angular errors, and implementing a bias correction technique may improve accuracy. The attenuation deviation from GT in the reconstruction with aligned background compensation was relatively small, with MSE $0.454 \times 10^{-5}$ and RMSRE of 1.07%. Increasing the position error corresponded to a decrease in the SSIM and PSNR metrics and an increase in MSE and RMSRE. The RMSRE value was below 2.0% when the position error reached 0.996 mm (millimeters), and the tolerance was extended to up to 1.992 mm after the bias correction, thus demonstrating the robustness of the technique, according to the present disclosure. Similarly, the RMSRE was below 2.0% for all angular errors within ±4.39°.

The bias correction improved the magnification error-affected image reconstruction. It should be noted that, since the effective ROI is scaled with the magnification factor, the intersection of the effective ROIs and the original ROI (radius 21 mm) was used for evaluation, with the radius set to 16.8 mm. The metrics on the reconstruction before the bias correction may change as the magnification error varies, demonstrating a relatively high sensitivity. With the bias correction method, RMSRE, in the case of −20% magnification error, is reduced to 1.67% from 10.43% within the effective ROI, demonstrating an acceptable robustness.

If the bias correction is performed on an aligned reconstruction, the metric scores decrease slightly in the inner region, within the radius of 16.8 mm, in contrast to a relatively tiny boost when evaluated on the whole ROI region (radius 21 mm). The decrease in metric scores suggests that the reconstruction is relatively accurate in the inner region when the compensation is well aligned. The attenuation estimation from the global reconstruction may not be perfect due to differences in resolution and existence of artifacts. It may be appreciated that linearity of the model to support the compensation method corresponds to an approximation to the polychromatic X-ray imaging process, which may bring residual errors into the peripheral region of the ROI. Thus, bias correction may not be performed if the system is relatively well calibrated and the accuracy of the registration for background compensation is acceptable. Otherwise, bias correction can be used for better performance.

In one embodiment, a CMCT system, according to the present disclosure, includes a micro-CT apparatus that incorporates a micro-focus source, a PCD, robotic arms and advanced imaging algorithms into a synergistic companion of a conventional CT scanner. A HR local scan protocol, according to the present disclosure, is configured to improve the dose efficiency. Additionally or alternatively, the HR local scan protocol may be configured to reduce the area of detectors. The cost of PCDs currently remains relatively high due to the complex manufacturing techniques. Hence, a hybrid system for interior tomography, according to the present disclosure, may reduce the system cost and radiation dose without compromising performance. In the local/interior scan, the advanced robotic arms allow the free selection of a VOL Additionally or alternatively, mobility of the robotic system may enable a surgeon to take projections from any view angle without moving the patient. This flexibility in view angle may be helpful in a number of applications, including, but not limited to, high-quality evaluation in emergencies and real-time feedback in surgeries. Additionally or alternatively to the exemplary application in inner ear imaging, the system may be used for other clinical imaging tasks that utilize high resolution in a VOI/ROI. Clinical imaging tasks that utilize high resolution in a VOI/ROI may include, but are not limited to, tumor examination in breast tissue, nodule characterization in lung, bone quality analysis, and plaque imaging in the heart and the neck.

While the hybrid design is one imaging system, additionally or alternatively, the robotic micro-CT scanner can be separately used, i.e., may be used without the medical CT scanner. For example, reconstruction results from a traditional CT scanner may be used as the prior knowledge according to the operations, as described herein. It may be appreciated that this may impose extra work in registration due to different positions of the patient in the local scan and an earlier global scan. Advantageously, a reconstruction method, according to the present disclosure, has a relatively good tolerance to geometric misalignment. Although the reconstruction is relatively sensitive to the magnification mismatch, the resultant attenuation shifting can be addressed with the bias correction method, according to the present disclosure.

It may be appreciated that an intensity of an X-ray source with micro-focus may have an insufficient flux to produce an appropriate signal to noise ratio through a human head during a relatively short scan time. To obtain an appropriate contrast, an X-ray source with a slightly larger focal spot may be used to provide enough power. The increased focal spot may generate shadows in the projections and blur structural details. A balance between the X-ray intensity and image resolution may be achieved using a deep learning deblurring method. Although the cone-beam projection with the finite focus spot is no longer a spatially invariant linear system, advanced deep learning techniques have the capability to perform shift-variant deblurring tasks. It may be appreciated that big data of paired blurred-original projections may be difficult to obtain for training a deblurring network. Additionally or alternatively, a forward projection model may be constructed to synthesize the paired data. Then, the network trained with simulated data may be fine-tuned with a small amount of paired real projection data. The trained network may then be applied on blurred projections for inference.

Deep image denoising techniques may be used to reduce radiation dose and improve image quality. According to a level of supervision during training, three types of deep denoising methods have been developed, i.e., supervised learning, weakly-supervised learning, and unsupervised learning. Supervised learning methods were designed for image denoising and achieved the best performance, such as deep CNNs (convolutional neural networks) with residual learning or with recurrent persistent memory units. Weakly-supervised learning methods relax the requirement of paired noisy-clean data to unpaired noisy-clean data or paired noise-to-noise data. Using the unpaired noisy-clean data, a GAN (Generative Adversarial Network)-based learning technique may be configured to create pairs of corresponding noisy-clean images as the training data. It is contemplated that paired noise-to-noise images may be equivalent to the paired noisy-clean images in training a model, achieving a denoising performance competitive with supervised learning methods. For the applications where unpaired noisy-clean or paired noise-noise images are unavailable, unsupervised learning methods may be configured to use single noisy images for training. Deep image prior is a generation process that maps the random noise to a single noisy image, and when the training process is terminated at a selected moment the network is configured to produce a denoised image. A Noise2Void network and its variants may achieve promising results using individual noisy images in training a network. It may be appreciated that a Noise2Void network is configured to estimate a blind-spot in an image so that the network learns to map the surrounding pixels to the blind-spot, achieving relatively good denoising results.

In an inner ear imaging application, paired noise-clean images may be synthesized via a Monte-Carlo simulation, for example, and single actual noisy images may be acquired with the CMCT system, according to the present disclosure. The former data type (i.e., synthesized paired noise-clean images) may support supervised training although the noise may not perfectly match the real counterpart, while the latter type of data (i.e., single actual noisy images) contains realistic noise and texture. Combining these two types of datasets, a semi-supervised leaning method may be configured to learn from the data with and without ground truth labels simultaneously. For example, the model can be trained in the Noise2Void mode first and then fine-tuned with the paired noisy-clean data or vice versa. Additionally or alternatively, the model may be trained in the Noise2Void and supervised modes simultaneously.

It may be appreciated that performing a local/interior scan in a multi-channel photon-counting mode, yields energy information that may then be used for spectral analysis. Spectral analysis may then allow or facilitate K-edge imaging, material decomposition, beam hardening correction, and/or metal artifact reduction. Compared with dual-energy CT, the PCD provides relatively more energy channels and may be relatively more informative. It is contemplated that spectral distortion issues at high imaging speed, if present, may be overcome with a deep learning based correction method. It is contemplated that the direct spectral measurement with the PCD may allow better spectral separation than dual-source, fast kVp-switching, and dual-layer detector techniques. Most relevant to the example inner ear imaging application is to utilize the X-ray energy dependent attenuation information for beam hardening correction, metal artifact reduction and material decomposition so that the effects of the implanted electrodes and micro-environments can be relatively accurately modeled.

Thus, this disclosure relates to a robotic arm-based clinical micro-CT apparatus, method and/or system. The robotic arm-based clinical micro-CT apparatus, method and/or system, according to the present disclosure, may include a clinical micro-CT scanner. In an embodiment, the robotic arm-based clinical micro-CT apparatus may include the clinical micro-CT scanner and a computing device. In an embodiment, the clinical micro-CT scanner may include a micro-focus tube, and a PCD, each mounted on a robotic arm. The clinical micro-CT apparatus may be configured to perform interior tomography. In some embodiments, the clinical micro-CT apparatus may be configured to implement deep learning.

In some embodiments, a clinical micro-CT (CMCT) system may include the clinical micro-CT apparatus combined with or coupled to a clinical CT scanner. A clinical micro-CT system may thus include the clinical micro-CT scanner, and the computing device and may include the clinical CT scanner. In some embodiments, the clinical micro-CT scanner and/or apparatus may be used separately, i.e., may not be coupled to the clinical CT scanner.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. Each module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory circuitry 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory circuitry may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A micro-CT (computed tomography) apparatus comprising:
   an x-ray source coupled to a source robotic arm;
   an x-ray detector coupled to a detector robotic arm;
   processor circuitry, including one or more graphics processing units;
   a user interface; and
   memory circuitry, configured to store in memory a plurality of functional modules and data,
      wherein the plurality of functional modules includes:
         a data acquisition module configured to acquire local scan data of a volume of interest (VOI) contained in an imaging object, and
         a reconstruction module configured to reconstruct an image of the VOI based, at least in part, on the local scan data, and based, at least in part, on background compensation data.

2. The micro-CT apparatus of claim 1, wherein the plurality of functional modules further comprises a registration module configured to determine a local scanning geometry, the local scanning geometry determined based, at least in part, on global scan data of the imaging object, the global scan data including the VOI and having an associated global scanning geometry, the local scan data captured for the local scanning geometry.

3. The micro-CT apparatus of claim 2, wherein the registration module is further configured to determine a relative geometry between the global scanning geometry and the local scanning geometry based, at least in part, on a surface model of at least a portion of the imaging object, the VOI located relative to the surface.

4. The micro-CT apparatus of claim 1, wherein the plurality of functional modules further comprises a background module configured to estimate a background attenuation of the local scan data, the background attenuation corresponding to the background compensation data.

5. The micro-CT apparatus of claim 1, wherein the x-ray source comprises a micro-focus tube, and the x-ray detector comprises a photon-counting detector.

6. The micro-CT apparatus of claim 1, wherein the plurality of functional modules further comprises a refinement module configured to perform bias correction.

7. The micro-CT apparatus of claim 1, wherein the reconstructed image has a resolution of at least 50 micrometers (μm).

8. A micro-computed tomography (CT) system comprising:
- a medical CT scanner configured to perform a global scan of an imaging object; and
- a micro-CT apparatus comprising:
    - an x-ray source coupled to a source robotic arm;
    - an x-ray detector, coupled to a detector robotic arm;
    - processor circuitry, including one or more graphics processing units;
    - a user interface; and
    - memory circuitry, configured to store in memory a plurality of functional modules and data,
        - wherein the plurality of functional modules includes:
            - a data acquisition module configured to acquire local scan data of a volume of interest (VOI) contained in the imaging object, and
            - a reconstruction module configured to reconstruct an image of the VOI based, at least in part, on the local scan data, and based, at least in part, on background compensation data.

9. The micro-CT system of claim 8, wherein the plurality of functional modules further comprises a registration module configured to determine a local scanning geometry, the local scanning geometry determined based, at least in part, on global scan data of the imaging object, the global scan data including the VOI and having an associated global scanning geometry, the local scan data captured for the local scanning geometry.

10. The micro-CT system of claim 8, wherein the plurality of functional modules further comprises a background module configured to estimate a background attenuation of the local scan data, the background attenuation corresponding to the background compensation data.

11. The micro-CT system of claim 9, wherein the registration module is further configured to determine a relative geometry between the global scanning geometry and the local scanning geometry based, at least in part, on a surface model of at least a portion of the imaging object, the VOI located relative to the surface.

12. The micro-CT system of claim 8, wherein the x-ray source comprises a micro-focus tube, and the x-ray detector comprises a photon-counting detector.

13. The micro-CT system of claim 8, wherein the plurality of functional modules further comprises a refinement module configured to perform bias correction.

14. The micro-CT system of claim 8, further comprising an optical surface scanner.

15. A method of clinical micro-computed tomography (CT), the method comprising:
- emitting, by an x-ray source, x-ray photons, the x-ray source coupled to a source robotic arm;
- detecting, by an x-ray detector, at least some of the emitted x-ray photons, the x-ray detector coupled to a detector robotic arm;
- acquiring, by a data acquisition module stored in memory circuitry, local scan data of a volume of interest (VOI) contained in an imaging object; and
- reconstructing, by a reconstruction module stored in the memory circuitry, an image of the VOI based, at least in part, on the local scan data, and based, at least in part, on background compensation data.

16. The method of claim 15, further comprising determining, by a registration module stored in the memory circuitry, a local scanning geometry, the local scanning geometry determined based, at least in part, on global scan data of the imaging object, the global scan data including the VOI and having an associated global scanning geometry, the local scan data captured for the local scanning geometry.

17. The method of claim 16, further comprising determining, by the registration module, a relative geometry between the global scanning geometry and the local scanning geometry based, at least in part, on a surface model of at least a portion of the imaging object, the VOI located relative to the surface.

18. The method of claim 15, further comprising estimating, by a background module stored in the memory circuitry, a background attenuation of the local scan data, the background attenuation corresponding to the background compensation data.

19. The method of claim 15, further comprising performing, by a refinement module stored in the memory circuitry, bias correction.

20. The method of claim 15, wherein the x-ray source comprises a micro-focus tube, and the x-ray detector comprises a photon-counting detector.

* * * * *